UNITED STATES PATENT OFFICE.

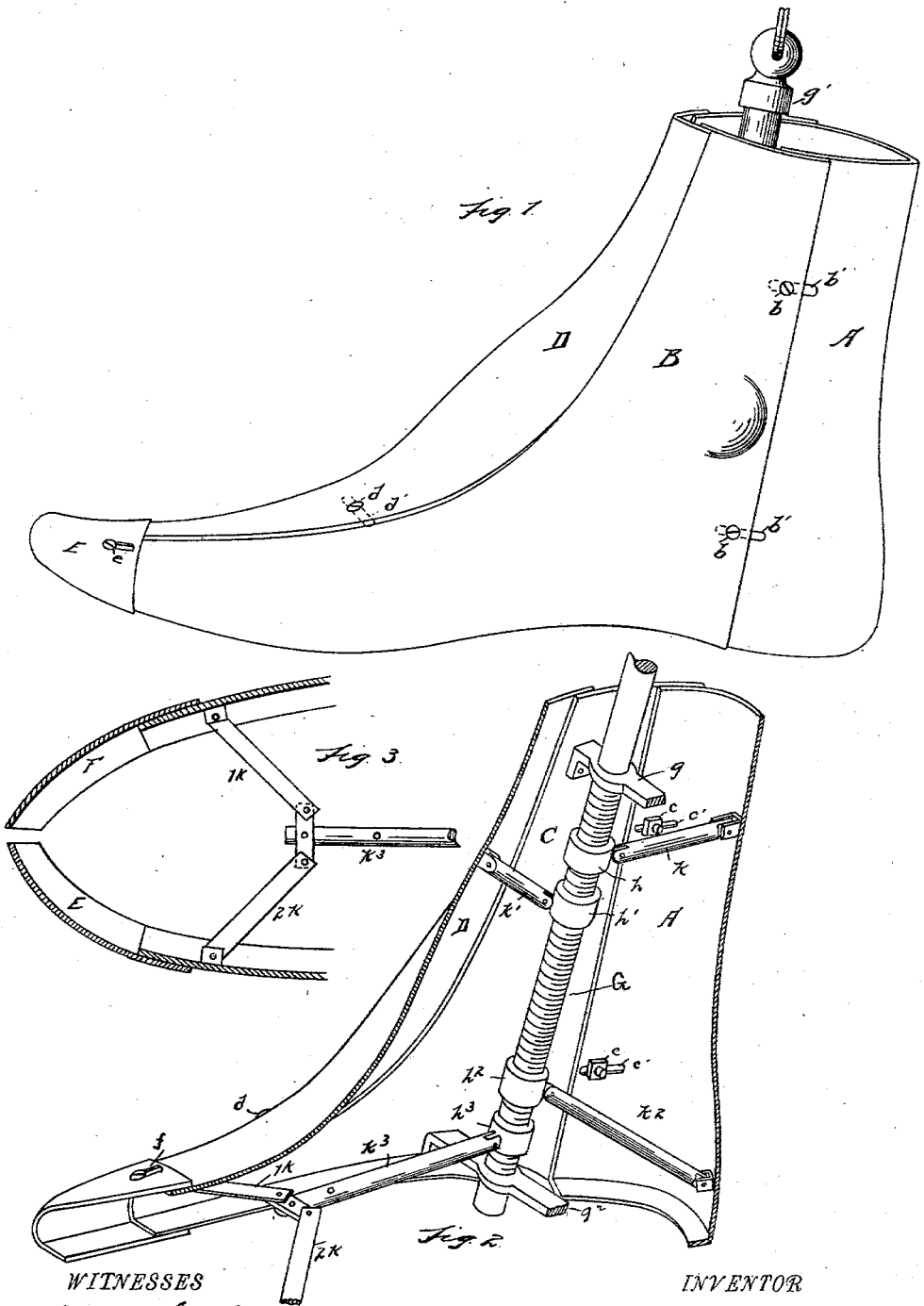

ABRAHAM G. GUINDON, OF DETROIT, MICHIGAN.

EXTENSIBLE SHOE-FILLER.

SPECIFICATION forming part of Letters Patent No. 629,853, dated August 1, 1899.

Application filed August 6, 1898. Serial No. 687,955. (No model.)

*To all whom it may concern:*

Be it known that I, ABRAHAM G. GUINDON, a citizen of the United States, residing at Detroit, county of Wayne, State of Michigan, have invented a certain new and useful Improvement in Extensible Shoe-Fillers; and I declare the following to be a full, clear, and exact description of the invention, such as will enable others skilled in the art to which it pertains to make and use the same, reference being had to the accompanying drawings, which form a part of this specification.

This invention relates to a shoe-filler, and has for its object a shoe-distender or shoe-filler intended to be used to shape and keep in shape shoes or boots. It may be used in stores or shops to shape and properly distend shoes that are exhibited for sale, or it may be used to keep in proper shape shoes that have been in use and that are temporarily laid aside.

It is well known that when shoes have been in use for a period they are more or less permeated with moisture, and if they are then laid aside even for a short time they draw and warp out of shape in drying.

A shoe-filler embodying this invention can be easily and readily inserted and expanded and will hold the shoe in shape.

In the drawings, Figure 1 is a perspective showing the complete device. Fig. 2 is a perspective showing the device with half the covering removed. Fig. 3 is a horizontal cross-section of the toe part of the device.

The device is a shell structure made with several parts, some of which overlap others, and each overlapping part is connected to one of the underlying parts by slip-joints. Within the shell is a screw-rod upon which there are a number of runner-nuts, and to each nut is connected one or more links that serve to actuate the several parts of the shell and expand or contract the entire filler.

A indicates what I will call the "heel-section."

B C indicate the side sections.

D indicates the instep-section.

E F indicate the toe-sections.

The heel-section A extends around from one side section B to the other side section C and is connected to both side sections by bolts $b\ b\ c\ c$, that pass through elongated slots $b'\ b'\ c'\ c'$ in one of the parts. The slots have their long axes in the direction in which the parts are to move in expanding or contracting. The instep-section D extends from one side section to another and is connected to both by bolts $d\ d$, and these bolts also pass through elongated slots $d'\ d'$. The two sections E F are joined to the side sections by bolts $e\ f$.

The actuating mechanism consists of a screw G, journaled in brackets $g\ g^2$, which are fastened to one of the side sections and provided at its upper end with a key or wrench seat $g'$, or the screw may terminate at this end with a knob, if desired. Properly located on the screw are runner-nuts $h\ h'\ h^2\ h^3$, and to each nut is secured a link $k\ k'\ k^2\ k^3$. Each link is pinned to the nut with which it is connected, and each link is also pinned to one of the shell-sections. The nut $h$ and the nut $h^2$ are linked to the heel-section A. The nut $h'$ is linked to the instep-section D. The nut $h^3$ is linked by a toggle-link $k^3\ 1^k\ 2^k$ to the front ends of the side sections.

In use the turning of the screw G actuates all the shell-sections except the toe-sections. It also actuates the toe-sections in an indirect way, first pushing said sections forward and then expanding them sidewise, and it is not necessary to make the filler to any particular size, as it is capable of considerable range of adjustment. After the filler is placed in the shoe the side sections and the toe-sections are pushed forward by the actuating-screw by means of the link connection until the toe-sections press against the toe part of the shoe, the side sections and the toe-sections moving forward together until the toe-section is obstructed by the toe of the shoe. Then all of these sections expand sidewise, the side sections being crowded under the toe-sections somewhat, but still pushing the toe-section firmly into the shoe.

In cases where shoes of special shape are to be kept in shape it may be necessary to have the filler made to conform to that special shape, but generally it need only be made to conform to the general style of the shoe it is to fill.

What I claim is—

1. In an adjustable shoe-filler, the combination of a metallic shell made in sections, comprising instep, toe, side, and heel sections, said sections being provided with elongated slots, bolts engaging through said slots, an actuating-screw, runner-nuts on said screw, and link connections from the nuts to the sections, arranged to adjust the size of the device, the toe-sections being connected to the side sections by slip-joint connections, whereby they expand sidewise with the side sections and adjust themselves longitudinally, substantially as described.

2. In an adjustable shoe-filler, the combination of a metallic shell made in sections provided with elongated slots, bolts engaging through said slots, the said sections consisting of heel, side, instep, and toe sections, brackets secured to a side section, an actuating-screw journaled in said brackets at its upper and lower ends, independent runner-nuts, and link connections from each nut to one or more of said sections, toggle-links connecting the forward end of the side sections to one of said runner-nuts, said toe-sections being held by slip-joints to the side sections, whereby the side sections and the toe-sections are actuated from a single runner-nut, substantially as described.

In testimony whereof I sign this specification in the presence of two witnesses.

ABRAHAM G. GUINDON.

Witnesses:
CHARLES F. BURTON,
VIRGINIA M. CLOUGH.